R. T. BAKER.
TIRE PROTECTOR.
APPLICATION FILED MAR. 15, 1919.
1,336,271.
Patented Apr. 6, 1920.
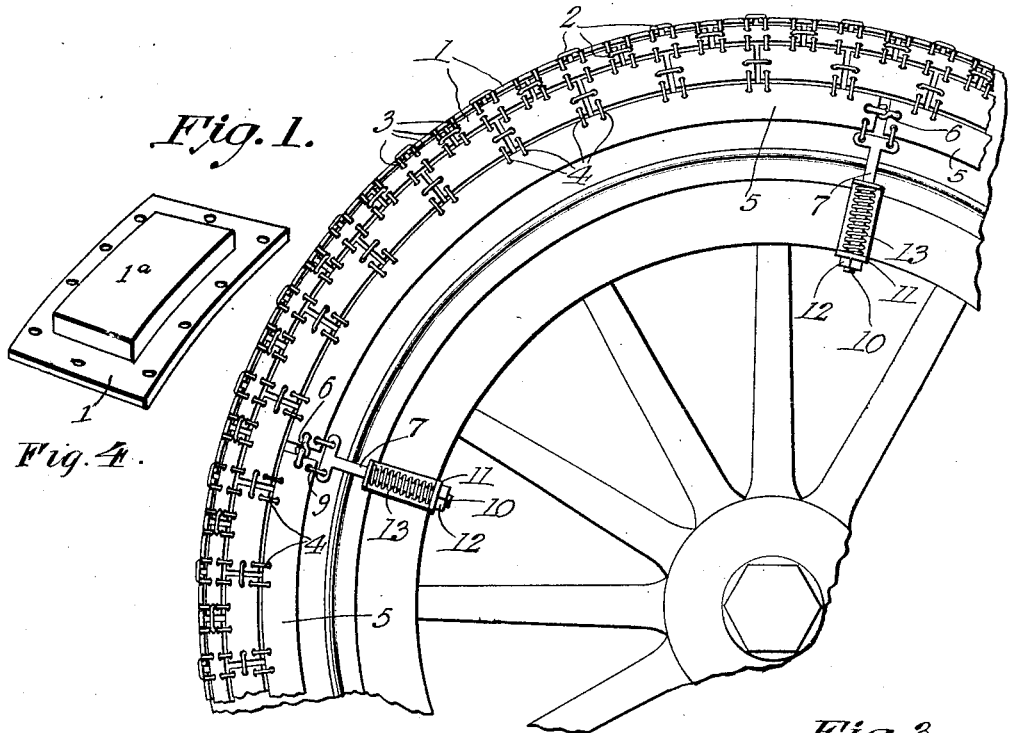
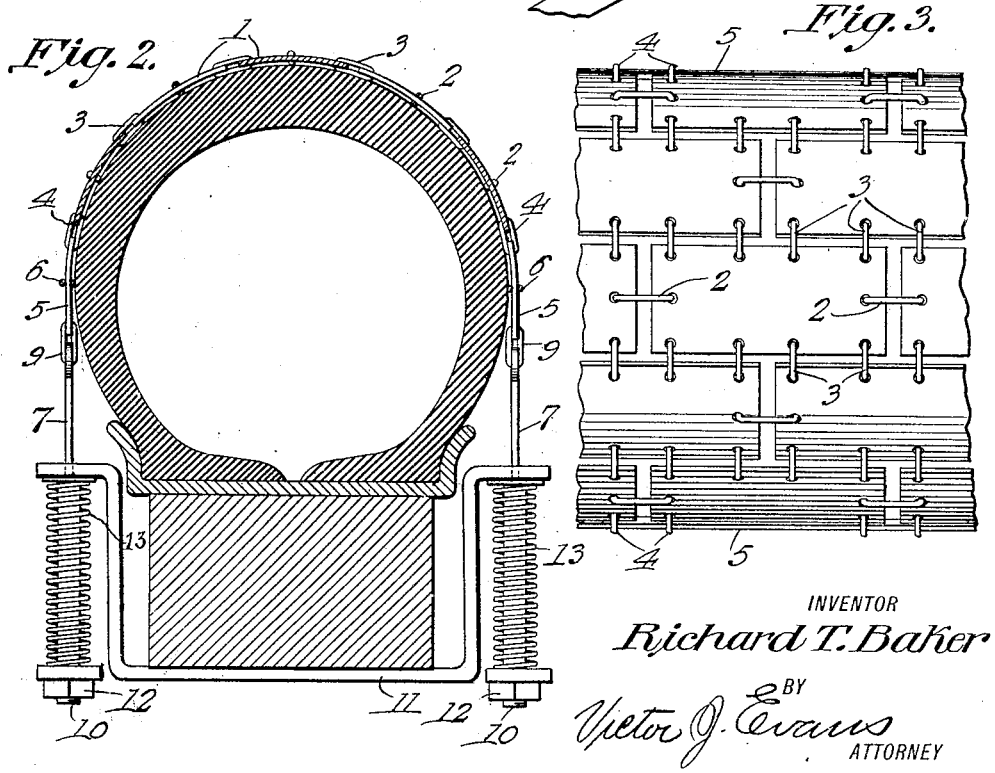
INVENTOR
Richard T. Baker
BY
Victor J. Evans
ATTORNEY

UNITED STATES PATENT OFFICE.

RICHARD T. BAKER, OF PHILADELPHIA, PENNSYLVANIA.

TIRE-PROTECTOR.

1,336,271.  Specification of Letters Patent.  Patented Apr. 6, 1920.

Application filed March 15, 1919. Serial No. 282,925.

*To all whom it may concern:*

Be it known that I, RICHARD T. BAKER, a citizen of the United States, residing at Philadelphia, in the county of Philadelphia and State of Pennsylvania, have invented new and useful Improvements in Tire-Protectors, of which the following is a specification.

This invention relates to tire protectors, the device being especially designed for the protection of pneumatic tires in order to prevent puncturing the same and also to prevent injurious blowouts and cuts.

The improved protector is made entirely of metal, comprising a large number of sections or pieces which are linked together so that the protector as a whole may be flexible throughout both longitudinally and transversely of the tire, the protector as a whole being applied to and held in relation to the tire and rim of the wheel in such a manner that full compensation is allowed for under the ordinary distortion of the tire in actual road use.

With the above and other objects in view the invention consists in the novel construction, combination and arrangement herein fully described, illustrated and claimed.

In the accompanying drawing:—

Figure 1 is a side elevation of the improved protector in its applied relation to a tire and wheel.

Fig. 2 is an enlarged cross section through the same.

Fig. 3 is a fragmentary plan view of the protector illustrating the construction thereof.

Fig. 4 is a detail view of a modified form of plate.

The improved tire protector comprises several longitudinal or circumferential series of tread pieces, each elongated circumferentially of the tire and of any suitable size according to the size of the tire in connection with which the protector as a whole is used. The tread pieces 1 are connected together by links 2 at their ends and are also connected together by transverse links 3.

The outer series of tread pieces 1 are connected by transversely extending links 4 to laterally arranged sectional annular rim members 5, each of said members 5 preferably consisting of four curvilinear sections as shown in Fig. 1, the same being connected flexibly together at their adjacent ends by means of links 6. Two of such rim members 5 are employed, the same being arranged at opposite sides of the several series of tread pieces 1.

In connection with each of the sections 5 I employ clamping or fastening means for securing the protector as a whole to the rim and tire of a wheel in the manner illustrated in Fig. 1. For this purpose I employ T-shaped bolts 7, the heads of which are connected by means of links 9 to the adjacent extremities of the sections 5 as best shown in Fig. 2. The adjacent ends of the sections 5 may be thus said to be coupled together by means of the respective bolts 7 and links 9 and said connection is flexible. The bolts 7 are threaded as shown at 10 and inserted through clamping U-shaped members 11 extending across the inner side of the rim or felly of the wheel, clamping nuts 12 being threaded upon the said bolts. Compensating springs 13 are placed around the bolts 7 and bear against the respective clamping bars 11 so that when the tire is compressed at its point of contact with the road surface, said springs take up on the protector and prevent the same from working loose or slipping circumferentially or transversely in relation to the tire.

The protector will prevent puncture and also prevent blowouts and will greatly prolong the life of the tire thereby adding to the economy of motoring. In view of the fact that the protector as a whole is flexible throughout, it will not interfere with the resiliency of a pneumatic tire. It may of course be removed from one tire and applied to another at the will of the owner of the machine.

The tread members 1 may be formed with raised or thickened central body portions 1ª as shown in Fig. 4 to protect the links 2 and 3 and prevent contact between said links and the road surfaces.

I claim:—

1. A tire protector embodying several series of metallic tread pieces elongated circumferentially of the tire, sectional rim members arranged at opposite sides of said tread pieces and having a hinge connection therewith, links connecting said tread pieces both circumferentially and transversely of the tire, clamping bolts arranged at the adjacent ends of the sections of the rim, each bolt having a link connection with two sections and means whereby said bolts are connected to the wheel for holding the protector upon the tire.

2. In a tire protector, the combination of circumferential series of tread pieces, sectional rim members arranged at opposite sides of said series of tread pieces and having a link connection therewith, said tread pieces being connected by longitudinal and transverse links and T-shaped bolts having a link connection with the adjacent end of the respective rim members, and means whereby said bolts are connected to the wheel for holding the protector upon the tire.

In testimony whereof I affix my signature.

RICHARD T. BAKER.